United States Patent [19]

Elias

[11] 4,241,471
[45] Dec. 30, 1980

[54] POLISHING APPARATUS

[76] Inventor: Alfonso G. Elias, P.O. Box 5743, Tucson, Ariz. 85703

[21] Appl. No.: 12,129

[22] Filed: Feb. 14, 1979

[51] Int. Cl.³ ............................................... B60S 1/02
[52] U.S. Cl. .................................... 15/250 R; 51/126
[58] Field of Search ............... 15/250 R; 51/47, 68, 51/99, 126

[56] References Cited

U.S. PATENT DOCUMENTS 12,766  4/1851  Robbins ............................... 51/126
4,112,987  9/1978  Pachnik ............................ 51/126 X

FOREIGN PATENT DOCUMENTS 1223302  2/1960  France ................................ 51/126

*Primary Examiner*—Christopher K. Moore
*Attorney, Agent, or Firm*—Allegretti, Newitt, Witcoff & McAndrews

[57] ABSTRACT

A glass-polishing apparatus is disclosed. The apparatus includes a glass polisher rotatably securable to the windshield wiper mount of a vehicle.

15 Claims, 4 Drawing Figures

POLISHING APPARATUS

BACKGROUND OF THE INVENTION

The present invention relates to an apparatus for removing blemishes or scratches from a glass surface, such as the windshield of a vehicle.

Failure to replace worn windshield wiper blades often results in substantially arcuate scratches on the vehicle windshield. Such scratches are unsightly, but more significantly, they impair the vision of the vehicle operator. The scratches and the grounded glass imbedded therein refract light, which has a blinding effect. This problem is particularly acute at night when the headlights of upcoming traffic strike the scratches.

The scratched windshield can, of course, be replaced. However, this alternative is an expensive one.

The other alternative is to remove the scratch by polishing. Unfortunately, polishing by hand and polishing with a hand-held polisher are presently the only readily available methods, and both suffer from serious shortcomings.

Fatigue and time consumption are two problems. Other significant problems include resultant distortion in the windshield, cracking due to the generation of excessive heat, and inability to accurately follow the arc of the scratch.

SUMMARY OF THE PRESENT INVENTION

In a principal aspect, the present invention is an apparatus for removing blemishes from a glass surface. A particular application of the present invention relates to glass windshields for vehicles and scratches therein caused by improperly maintained windshield wipers. Such scratches generally have an arcuate configuration.

The present invention includes a glass polisher or buffer, a guide and an attachment. The attachment is secured to a mount, such as the windshield wiper mount of a vehicle. The guide extends from the attachment, and the guide and attachment are rotatable about the mount.

The glass polisher is slideably connected to the guide, such that the glass polisher can be secured at a predetermined distance from the mount. As such, the glass polisher is movable in an arcuate path.

It is thus an object of the present invention to provide an apparatus for removing scratches in a glass surface which is inexpensive and easily operated. Another object is a scratch-removing apparatus which is adjustable and capable of accurately tracking substantially arcuate scratches.

Still another object is a scratch removal system wherein heat generation and distortion are controllable and thereby minimized. A further object of the present invention is to provide an apparatus for grinding a vehicle windshield which is safe and efficient.

These and other objects, features and advantages of the present invention are set forth in or apparent from the following description of a preferred embodiment.

BRIEF DESCRIPTION OF THE DRAWINGS

A preferred embodiment is described with reference to the drawing wherein.

DETAILED DESCRIPTION OF A PREFERRED EMBODIMENT

Figure 1:
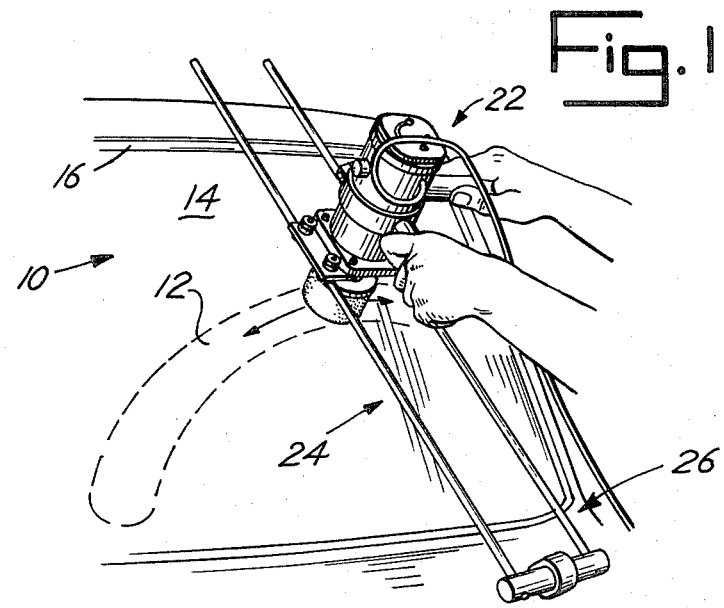
FIG. 1 is a perspective view of a preferred embodiment of the present invention for use in removing scratches from the windshield of an automobile.

In FIGS. 1-4, a preferred embodiment of the present invention is shown as an apparatus 10 for removing a scratch 12 from the windshield 14 of a vehicle 16. It is to be understood, however, that this disclosure represents a single preferred embodiment and that the present invention is not limited to this particular application. For example, the apparatus 10 is adaptable for use with windows, table tops, and other similar surfaces. Furthermore, the term "vehicle" is used generically herein to include automobiles, trucks, airplanes, watercraft, etc. However, for the sake of brevity, only an automobile 16 is shown and discussed.

The scratch 12, as shown, has a substantially arcuate configuration. A primary cause of such a scratch 12 is a defective windshield wiper or a defective wiper blade (not shown). The windshield wiper is secured to a windshield wiper mount 18, adjacent the lower edge 20 of the windshield 14.

In this preferred embodiment, the mount 18 is a substantially cylindrical shaft. The windshield wiper assembly (not shown) receives the shaft 18 and is secured thereto by a retaining screw. The mount 18 is rotatably driven to move the windshield wiper across a predetermined sector.

The scratch removal apparatus 10 includes primarily glass polisher or buffer means 22, guide means 24 and attachment means 26. The attachment means 26 is secured to the windshield wiper mount 18 and the guide means 24 extends upwardly from the attachment means 26, over and substantially parallel to the windshield 14.

The polisher means 22 is slideably mounted on the guide means 24. The polisher means 22 is rigidly securable on the guide means 24 at any distance from the attachment means 26.

In cooperation, the guide means 24 and attachment means 26 permit rotation of the polisher means 22. That is, the guide means 24 and attachment means 26 define rotation means, generally designated 28, for rotating the polisher means, generally designated 38, for rotating the polisher means 22 over an arcuate path about the mount 18. The radius of the arcuate path is the distance of the polisher means 22 from the mount 18.

Operationally, the glass polisher means 22 is centrally positioned over the scratch 12 and fixedly secured to the guide means 24. The glass polisher means 22 is then activated and moved along the scratch 12 until removal is completed.

In this preferred embodiment, the glass polisher means 22 includes a glass polisher 30 having a housing 32, a rotatable shaft 34, a shaft head 36 and a substantially cylindrical felt pad 38. The shaft 34 extends from the housing 32 along the longitudinal axis thereof, and the felt pad 38 is secured to the shaft head 36.

The rotatable shaft 34 is driven by a reversible, variable speed motor 40 (shown in phantom in FIG. 2) within the housing 32. The apparatus 10 further includes control means, generally designated 42, for selecting and regulating motor direction and speed. The reversibility and variable speed of the polisher means 22 facilitates grinding and control of heat generation. Preferably the control means 42 includes a control box 44 having a bracket 46, such that the control means 42 can be conveniently mounted on the window (not shown) of the vehicle 16.

The polisher means 22 also includes a ring 48 and a pair of handles 50 extending radially from the ring 48. The ring 48 is adjustably secured to the housing 32 by a ring tightener 52. As shown, the handles 50 are aligned at a right angle, and prior to initiation of the polishing process, the handles 50 are set in the position found most convenient by the user.

A substantially square connecting plate 54 is secured to one end of the housing 32. The connecting plate 54 is substantially perpendicular to the rotatable shaft 34 and interposes the housing 32 and shaft head 36. At its corners, the connecting plate 54 includes two pair of aligned eyelets 56, 58, respectively, adapted to receive the guide means 24. The eyelet pairs 56, 58 extend towards the shaft head 36 and define access axes 60, 62, respectively, directed towards the attachment means 26.

Figure 4:
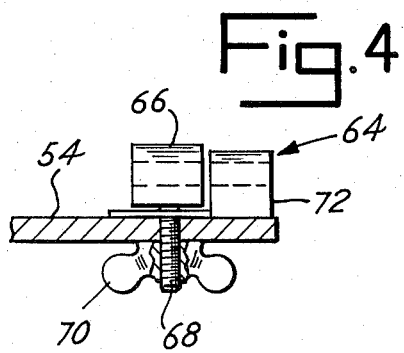
FIG. 4 is an enlarged, partial cross-sectional view of the glass polisher and guide shown in FIGS. 1 and 2.

Referring to FIG. 4, the polisher means 22 also includes or provides fastener means, generally designated 64, for rigidly securing the polishing means 22 to the guide means 24 at a predetermined distance from the attachment means 26. In this preferred embodiment, one eyelet 66 has a threaded shaft 68 adapted to engage an opening in the connecting plate 54 and to receive a butterfly nut 70. The shaft 68 also engages the flange of a locking block 72, securing the locking block 72 to the connecting plate 54 adjacent the eyelet 66.

The locking block 72 has an opening therethrough, which is slightly misaligned with the eyelet 66 whenever the butterfly nut 70 is tightened. This misalignment results in a clamping of the guide means 24, thereby securing the polishing means 22 thereon.

Figure 3:
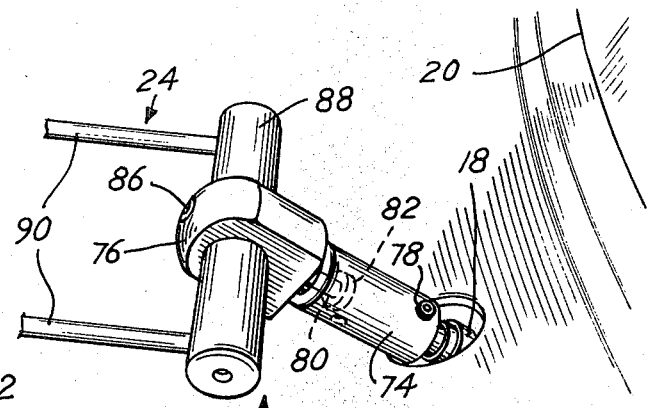
FIG. 3 is an enlarged perspective view of the attachment shown in FIG. 1.
Figure 2:
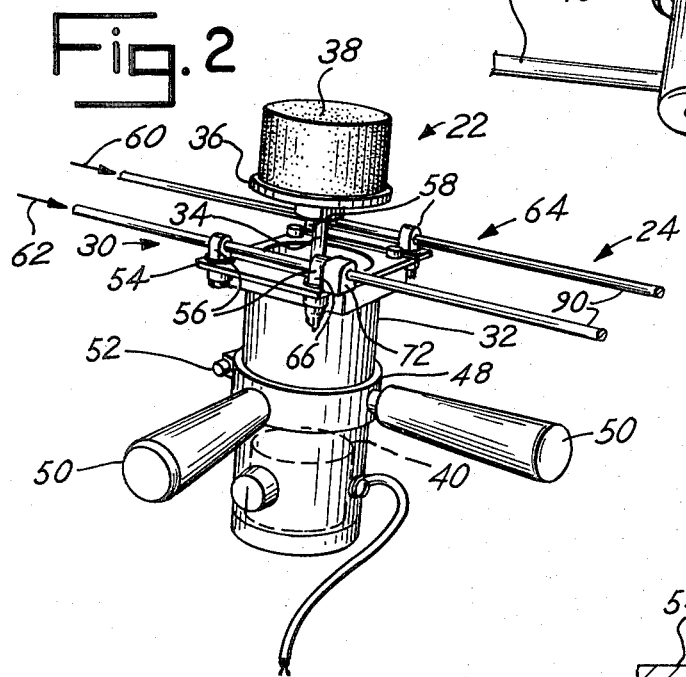
FIG. 2 is an enlarged perspective view of the glass polisher shown in FIG. 1.

The attachment means 26 is best shown in FIG. 3. In this preferred embodiment, the attachment means 26 includes an adapter 74 and a turret 76, rotatably connected to the adapter 74. The adapter 74 is substantially cylindrical and one end thereof is adapted to receive the windshield wiper mount 18. Three equally-spaced retaining screws 78 secure the adapter 74 to the mount 18.

The turret 76 has a shaft 80 (shown in phantom in FIG. 3) which extends into the adapter 74 opposite the mount-receiving end thereof. The shaft 80, extending along the longitudinal axis of the adapter 74, terminates with a flange 82 to maintain the interconnection between the adapter 74 and turret 76.

The turret 76 also defines an opening 84 therethrough substantially perpendicular to the shaft 80. A retaining screw 86 adjustably extends into the opening 84.

It is to be understood that the configuration of the attachment means 26 will vary with application of the apparatus 10. For example, the adapter 74 would be changed to accomodate a different type of windshield wiper mount 18. More broadly, a suction cup attachment could be substituted for the attachment means 26 herein disclosed whenever the apparatus 10 is used to polish a table top or window.

The guide means 24 of this preferred embodiment includes a crossbar 88 adapted to engage the opening 84 of the turret 76 and a pair of substantially parallel guide rods 90 adapted to engage the eyelet pairs 56, 58. As shown, the guide rods 90 are fastened to the crossbar 88 through openings at opposite ends thereof, on opposite sides of the turret 76.

The crossbar 88 slides within the opening 84. The crossbar 88 is secured therein by the retaining screw 84 at a position to substantially avoid contact or interference between the apparatus 10 and the vehicle 16.

The guide rods 90 extend upwardly from the attachment means 26 substantially parallel to the windshield 14. Tightening of the butterfly nut 70 rigidly affixes the polisher means 22 to the guide means 24, or more particularly to the guide rods 90, at the desired distance from the mount 18.

The adapter 74, turret 76 and crossbar 88 are preferably molded nylon to provide durability and avoid corrosion. The guide rods 90 are preferably stainless steel.

The apparatus 10 provides accurate tracking of the scratch 12 with the glass polisher 30. The handles 50 facilitate (1) rotation of the polisher means 22 about the mount 18, (2) working of the felt pad 38 along and over the scratch 12, and (3) application of substantially constant pressure upon the windshield 14.

As such, the apparatus 10 provides safe and efficient windshield polishing. Distortion is substantially minimized by the relatively constant pressure during polishing. Generated heat is also minimized as a result of the rapidity of the process and the ease in rotating the glass polisher 30.

The following claims define the true scope and spirit of the present invention. The foregoing disclosure shall be utilized in interpreting these claims.

What is claimed is:

1. An apparatus for removing a blemish from a windshield mounted on a vehicle, said blemish being displaced from a point on said vehicle, comprising, in combination:
    polisher means for polishing said blemish;
    guide means for maintaining said polisher means at a predetermined distance from said point, said polisher means being movable upon said guide means and being securable to said guide means at an operative position; and
    attachment means for securing said apparatus to said point on said vehicle, said guide means and said attachment means cooperatively defining rotation means for directing movement of said polisher means over a substantially arcuate path.

2. An apparatus as claimed in claim 1 wherein said polisher means includes control means for regulating the speed of said polisher means.

3. An apparatus as claimed in claim 1 wherein said guide means includes a pair of guide rods extending substantially parallelly from said attachment means.

4. An apparatus as claimed in claim 3 wherein said polisher means receives said guide rods therethrough and further includes fastener means for clamping said guide rods to secure said polisher means in said operative position.

5. An apparatus as claimed in claim 1 wherein said vehicle is an automobile and includes a windshield wiper mount located at said point.

6. An apparatus as claimed in claim 5 wherein said guide means and said attachment means rotatably secure said polisher means to said windshield wiper mount.

7. An apparatus as claimed in claim 6 wherein said guide means includes a pair of guide rods extending substantially parallelly from said attachment means.

8. An apparatus as claimed in claim 6 wherein said attachment means includes an adapter rigidly secured to said windshield wiper mount and a turret rotatably secured to said adapter.

9. An apparatus for removing a scratch from the windshield of a vehicle, said vehicle having a windshield wiper mount, comprising, in combination:
   an attachment means adapted to securingly receive said windshield wiper mount;
   a pair of guide rods extending from said attachment; and
   a glass polisher slideably mounted on said guide rods and securable thereto at a predetermined distance from said windshield wiper mount;
   said attachment and said guide rods defining in cooperation rotation means for directing movement of said glass polisher over a substantially arcuate path.

10. An apparatus as claimed in claim 9 wherein said glass polisher includes a motor, said apparatus further comprising control means for regulating the speed of said motor.

11. An apparatus as claimed in claim 9 wherein said attachment includes an adapter rigidly affixed to said windshield wiper mount and a turret rotatably attached to said adapter.

12. An apparatus as claimed in claim 11 wherein said turret defines an opening therethrough, said apparatus further comprising a crossbar adapted to engage said opening, said guide rods extending from said crossbar.

13. An apparatus as claimed in claim 9 wherein said glass polisher includes an adjustable handle to facilitate operation of said apparatus.

14. An apparatus as claimed in claim 9 wherein said glass polisher includes two pairs of substantially aligned eyelets to receive, respectively, said pair of guide rods.

15. An apparatus as claimed in claim 14 wherein said glass polisher further includes fastener means for clamping said glass polisher to said pair of guide rods.

* * * * *